Jan. 16, 1934.   R. C. SHAND   1,943,843
DISPENSING APPARATUS
Filed April 27, 1931   4 Sheets-Sheet 1
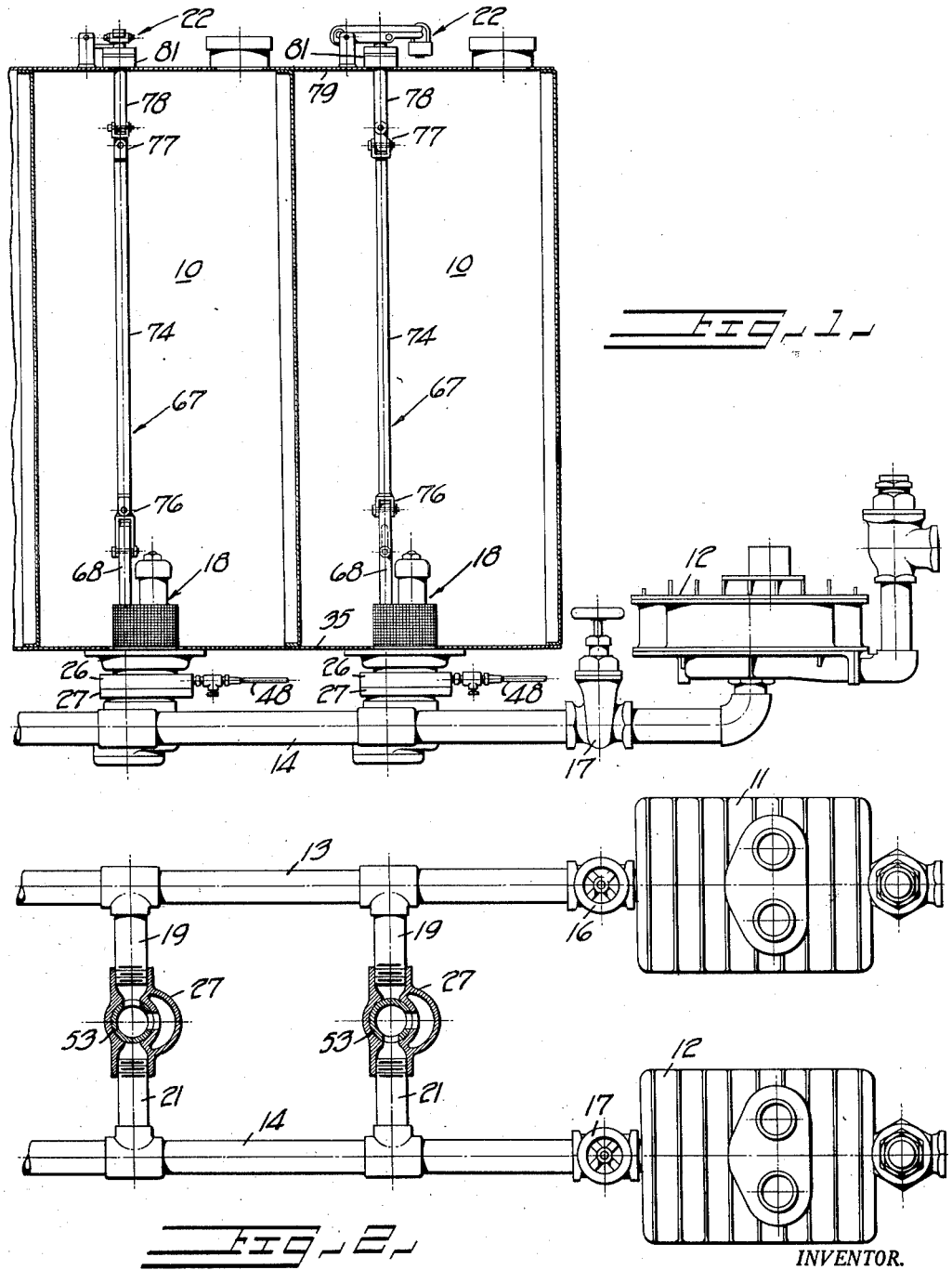
INVENTOR.
REGINALD C. SHAND
BY
White Prost, Flehr & Lothrop
ATTORNEYS.

Jan. 16, 1934.  R. C. SHAND  1,943,843
DISPENSING APPARATUS
Filed April 27, 1931  4 Sheets-Sheet 2
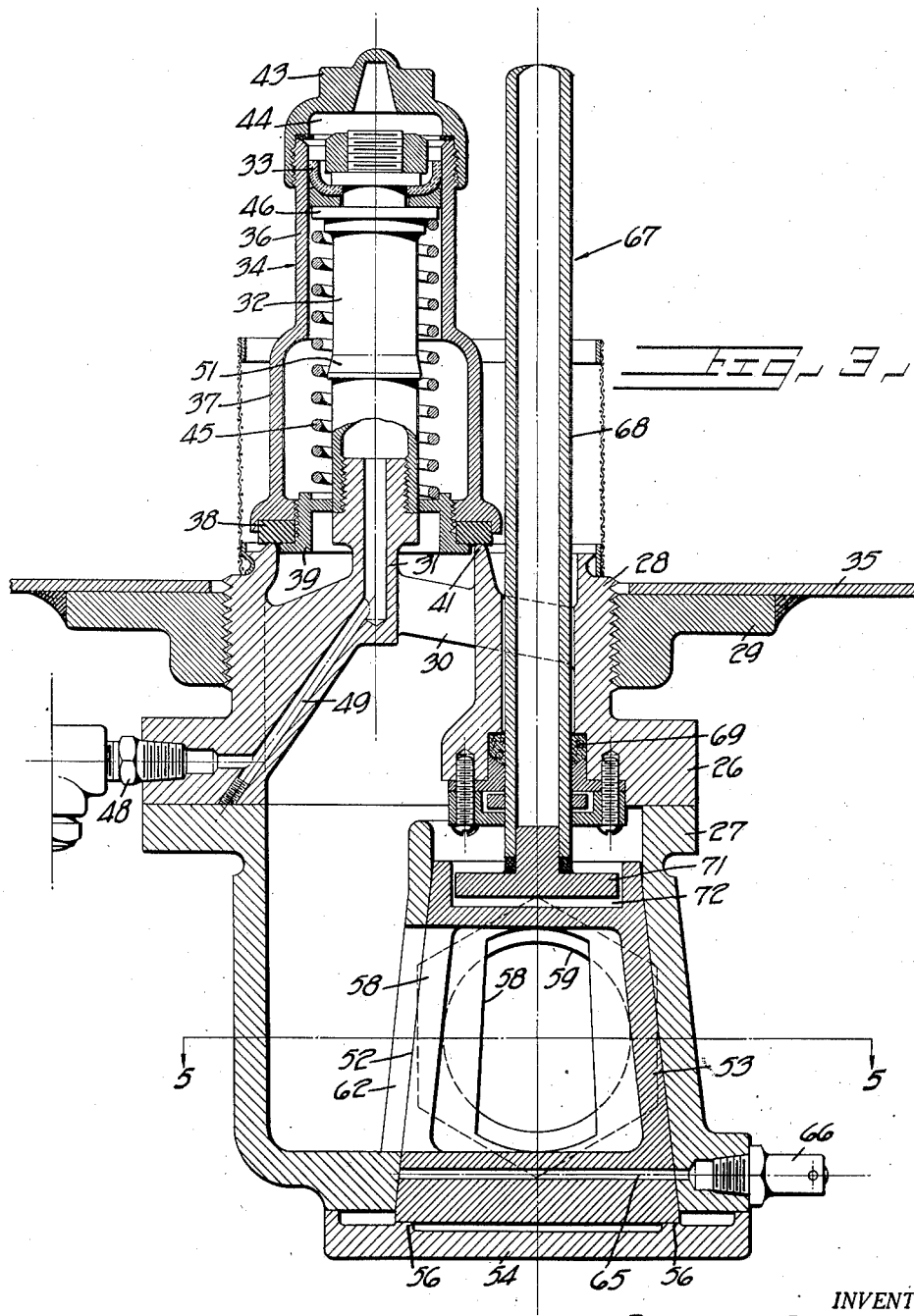
INVENTOR.
REGINALD C. SHAND
BY
ATTORNEYS.

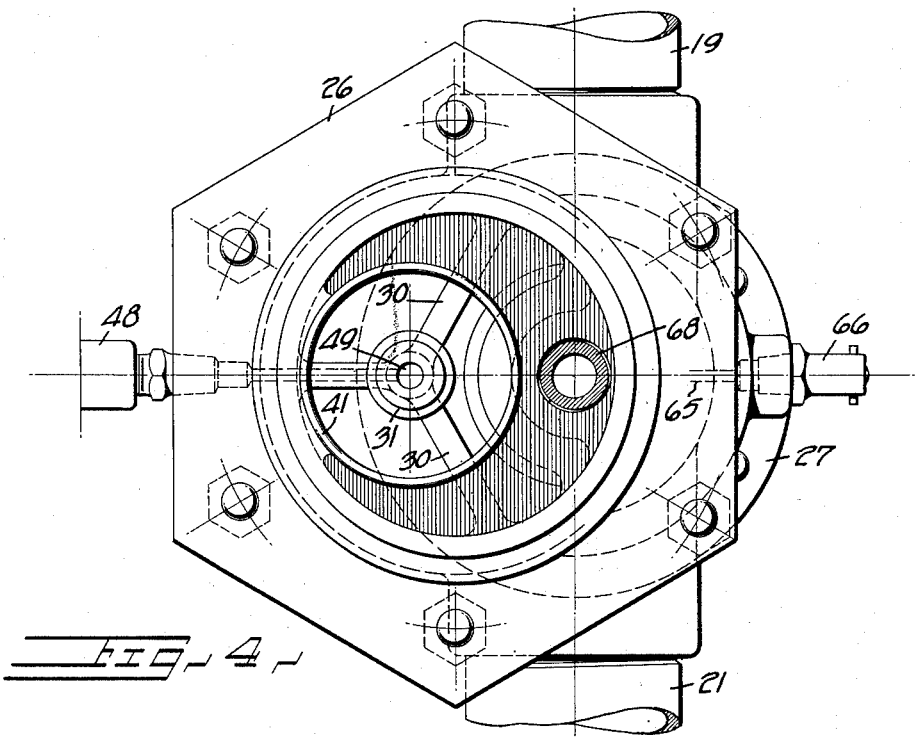
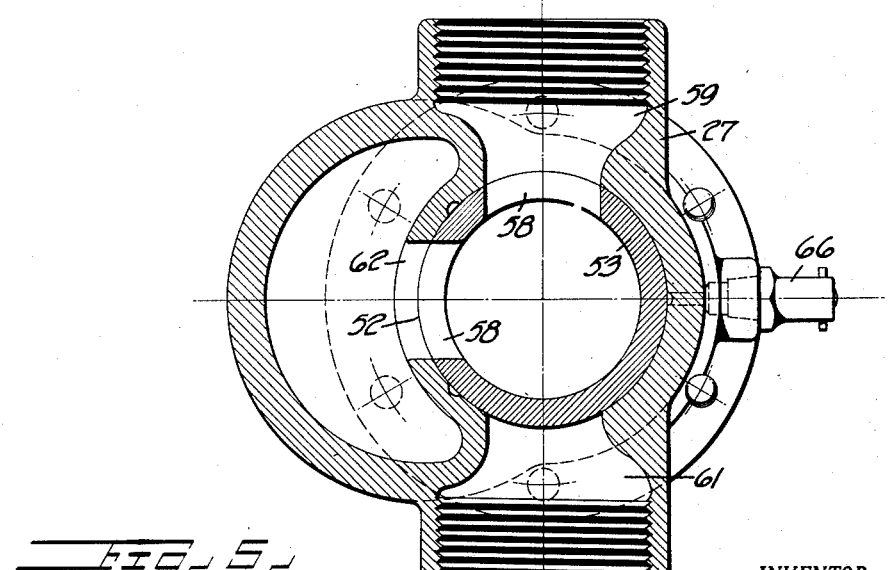

Jan. 16, 1934.  R. C. SHAND  1,943,843
DISPENSING APPARATUS
Filed April 27, 1931  4 Sheets-Sheet 4
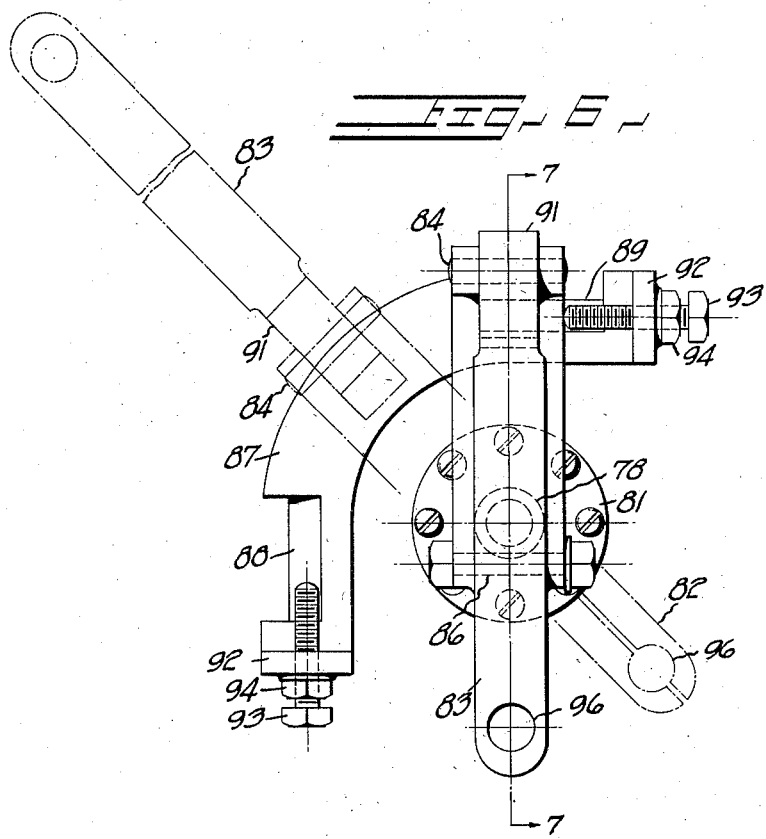
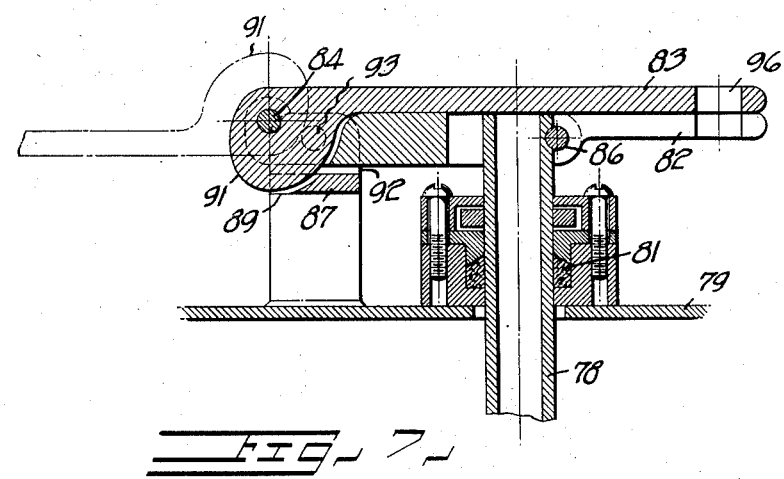
INVENTOR.
REGINALD C. SHAND
BY
White, Prost, Flehr & Lothrop
ATTORNEYS.

Patented Jan. 16, 1934

1,943,843

UNITED STATES PATENT OFFICE 1,943,843

DISPENSING APPARATUS

Reginald C. Shand, Piedmont, Calif.

Application April 27, 1931. Serial No. 533,192

6 Claims. (Cl. 137—21)

This invention relates generally to apparatus for dispensing various liquids from tanks or tank compartments. It has particular application to apparatus utilizing one or more valves whereby liquid from tanks or tank compartments can be dispensed thru either one of two or more discharge conduits, and can be used to advantage for the dispensing of inflammable liquids such as gasoline.

In the handling of liquids by motor tank trucks or car tanks, it is frequently necessary to carry two distinct separate types of liquid. As for example in distributing gasoline to filling stations, it is convenient for one motor tank truck to carry a standard gasoline, and also a high test or anti-knock gasoline. If these two separate types of gasoline are dispensed thru the same discharge conduits and metering devices, it is apparent that appreciable intermixture or contamination will result. It is an object of the present invention to prevent objectionable intermixture and contamination by the use of improved dispensing apparatus. In attaining this object the present invention is characterized by the use of separate discharge conduits and metering devices for handling the two different types of liquid. Means is provided whereby an operator can optionally place either conduit in communication with a particular compartment from which liquid is to be discharged. Therefore one metering device and one discharge conduit can be used continually for one particular type of liquid, although at different times different liquids may be placed in the same compartment.

It is a further object of the invention to devise improved apparatus of the above character whereby certain parts can be readily removed for repair or replacement, without disturbing other parts.

It is a further object of the invention to devise improved means for manually operating my apparatus, and for locking the apparatus in a given set position.

Further objects of the invention will appear from the following description in which the preferred embodiments of the invention are set forth in detail in conjunction with the accompanying drawings. It is to be understood that the appended claims are to be accorded a range of equivalents consistent with the state of the prior art.

Referring to the drawings:

Figure 1 is a side elevational view, partly in cross section, illustrating apparatus incorporating the present invention.

Fig. 2 is a plan view of the discharge conduits illustrated in Fig. 1 showing in cross section the distributing valves utilized in conjunction with these conduits.

Fig. 3 is an enlarged side elevational view in cross section, illustrating that part of my apparatus which controls dispensing of liquid from a remote point, and which controls distribution of the liquid to either one of two discharge conduits.

Fig. 4 is a plan view of my apparatus apart from the tank with which it is associated, with certain parts omitted, and with the distributing valve operating shaft shown in cross section.

Fig. 5 is a cross sectional detail taken along the line 5—5 of Fig. 3.

Fig. 6 is a plan detail view of the distributing valve operating device.

Fig. 7 is a cross sectional detail taken along the line 7—7 of Fig. 6.

Referring first to Fig. 1 there is shown the tank of a motor truck or car provided with separate compartments 10. Exteriorly of the tank liquid metering devices 11 and 12 are provided, which are connected to the separate liquid conduits 13 and 14. The outflow sides of metering devices 11 and 12 can connect to further conduits or faucets to which the liquid is to be delivered. Manual valves 16 and 17 can be provided for interrupting flow of liquid to the metering devices. Liquid flow control means, designated generally at 18 is located in the lower part of each compartment 10, exteriorly of the tank to both conduits 13 and 14, by branch pipes 19 and 21. As will be presently explained flow control means 18 includes a valve adapted to be actuated from a remote point, and also a distributing valve, the setting of which determines whether or not liquid flows from that particular compartment into conduit 13 or conduit 14. The distributing valve is preferably operated from the top of the tank by suitable operating means 22 to be presently described.

The details of the preferred form of fluid control means 18 can be explained by reference to Figs. 3 to 5 inclusive. It includes a hollow body formed of upper and lower parts 26 and 27. The upper body part 26 is provided with an externally threaded portion 28 for engaging a flange 29, this flange being secured to the bottom wall 35 of a liquid tank or compartment. The two casing parts are adapted to be removably clamped together in liquid tight engagement, by suitable means such as studs or bolts. Inwardly extending arms 30 are formed within the interior of the upper body part 26, and these arms serve to support an upstanding member 31. A tube like member 32 has its lower end secured to member 31, and has its upper end provided with a cup washer to form a piston 33.

Surrounding tube like member 32 and piston 33 there is a shell 34, one portion 36 of which forms a cylinder for piston 33, and the lower portion 37 of which is of enlarged diameter to form a movable valve member. A suitable seating ring 38 is secured to the lower edge of portion 37, by means of fitting 39, and this seating ring is adapted to cooperate with a stationary valve seat 41 formed upon the upper body part 26. Fitting 39 also slidably engages tube like member 32 to guide shell 34 in its movements. A closure cap 43 is secured to the upper end of shell 34, so that a closed liquid chamber 44 is formed above piston 33. Shell 34 is normally biased to a lowered or closed position by means of a compression spring 45, the upper end of this spring being seated upon a flange 46 formed on tube member 32, while the lower end of the spring is seated upon fitting 39. A pipe 48 connects with the upper body part 26, and this pipe is in communication with chamber 44 thru duct 49, and the interior of tube member 32. Upon application of liquid under pressure thru pipe 48, shell 34 is moved upwardly to open the valve, the upward movement being limited by annular shoulder 51.

Formed within the lower body part 27 there is a distribution control valve preferably of the rotatable plug type. Thus referring to Fig. 3 there is shown a conical inverted valve seat 52 within which a tapered plug 53 is rotatably disposed. A plate 54 removably clamped to the bottom side of body part 27, serves to close the large end of seat 52. This plate is provided with an annular shoulder 56 serving to engage the lower end of plug 53, thus maintaining this plug properly seated.

As shown more clearly in Fig. 5, plug 53 is provided with lateral openings or ports 58 arranged substantially 90 degrees with respect to each other. These ports are adapted to communicate with ports 59 and 61, which are spaced substantially 180 degrees with respect to each other, and also with the port 62 arranged substantially 90 degrees with respect to ports 59 and 61. Ports 59 and 61, which are in effect outflow passages, are adapted to communicate with the branch pipes 19 and 21 of the discharge conduits 13 and 14. Port 62 communicates with the interior of the body parts 26 and 27.

When the rotatable valve plug 53 is in the position illustrated in Fig. 5, it will be noted that liquid is free to flow from the interior of the body, thru the valve plug, and to the outflow passage 59 and pipe 19. When the plug is turned 90 degrees in a counterclockwise direction, liquid is free to flow from the interior of the body to the outflow passage 61 and pipe 21. In order to insure free working of the valves without undue leakage, the valve working surfaces can be lubricated by a suitable arrangement of lubricant grooves interrupting the valve working surfaces. Thus as shown in Fig. 3 the lower end portion of plug 53 is provided with a circumferential lubricant channel 65, into which lubricant can be introduced under pressure by means of a pressure lubricant fitting 66.

Rotation of plug 53 to its different operating position is preferably accomplished by an articulated operating rod or shaft 67 which extends down thru the tank from the upper side thereof, as shown in Fig. 1. This shaft includes a lower section 68 which extends down into the upper body part 26, a packing gland 69 being provided to prevent flow of liquid into the interior of the body, except by way of valve seat 41. To form a driving connection between the lower end of shaft section 68 and the upper end of valve plug 53, a rectangular head 71 is secured to the lower end of shaft section 68 and this head is positioned within a rectangular recess 72 formed in the upper end portion of plug 53. By means of such a driving connection the lower body part 27, together with valve plug 53, can be removed as a unit from the upper body part 26, without disturbing the operating shaft 67. Likewise in assembling the apparatus the plug 53 need not be exactly alined with the axis of shaft 67.

It appears more clearly in Fig. 1 the intermediate section 74 of shaft 67 has a universal connection 76 with the lower shaft part 68. The upper end of shaft section 74 has a universal connection 77 with an upper shaft section 78. Shaft section 78 extends thru the upper tank wall 79 as shown in Fig. 7, and is journaled in the packing gland 81. Associated with the outer end of shaft part 78 there is an operating lever consisting of two arms 82 and 83, which are hingedly connected together by pin 84. Arm 82 is fixed to shaft section 78 by suitable means such as a locking pin 86.

Mounted upon the upper tank wall 79 there is an arcuate or segmental shaped member 87, which underlies arm 82. This segmental member 87 is provided with notches 88 and 89, which are adapted to cooperate with a cam portion 91 formed upon arm 83. In order to form adjustable stops for limiting angular movement of arm 82, segmental member 87 is also provided with shoulders 92, into which are threaded the screws 93. Screws 93 can be retained in any given set position by a lock nut 94 and the ends of these screws are adapted to engage the side faces of arm 82, when this arm is moved to its limiting positions. When arm 83 is swung outwardly to an extended position as shown in dotted lines in Figs. 6 and 7, it is evident that cam portion 91 is swung out of engagement with either one of slots 88 or 89, to permit angular movement about the axis of shaft section 78 thru an angle of substantially 90 degrees. When in a limiting position, folding of arm 83 upon arm 82, as shown in full lines in Figs. 6 and 7, causes cam portion 91 to engage in one of the recesses 88 or 89, to lock shaft section 78 in that position. It will be noted that the ends of arms 82 and 83 which are remote from pivot pin 84 are provided with openings 96 adapted to register when arm 83 is in folded position. These apertures can accommodate the hasp of a padlock.

Operation of the complete apparatus can be briefly reviewed as follows:—Assuming that one of the tank compartments 10 contains a certain liquid which is to be disposed thru conduit 13 and metering device 11, the device illustrated in Figs. 6 and 7 is set in such a position that the valve plug 53 of that particular compartment establishes communication with the corresponding branch pipe 19. Liquid under pressure, from some suitable hydraulic actuator is then applied to pipe 48 to move the valve shell 34 to open position, thus permitting the dispensing of liquid thru conduit 13 and metering device 11. If at another time the same compartment contains another liquid which it is desired to dispense thru conduit 14 and metering device 12, valve plug 53 is set in its other operating position to distribute liquid to this conduit and metering device, rather than to the conduit 13.

I claim:

1. In apparatus of the character described, a hollow body formed of separable upper and lower parts, the upper part being adapted to be secured to a wall of a tank and the lower part being adapted to be positioned outside the tank, valve means mounted upon the upper body part and adapted to be disposed within the tank, a plurality of conduits communicating with the lower body part exteriorally of the tank, a distributing valve mounted within the lower body part and adapted to control flow of liquid from the body thru said conduits, and a rotatable operating member having a driving connection with said distributing valve, whereby said lower body part can be removed from the upper body part, together with said distributing valve.

2. In apparatus of the character described, a hollow body formed of upper and lower separable parts, the upper part being adapted to be secured to the lower wall of a liquid tank and the lower part being adapted to be positioned outside the tank, valve means mounted upon the upper part and adapted to be disposed within the tank, said valve means when open serving to permit flow of liquid from the tank into the body, a rotary plug valve mounted within the lower body part, a plurality of liquid discharge conduits communicating with the lower body part, said plug valve serving to distribute liquid from the interior of the body to said discharge conduits, a rotatable operating member extending down thru the tank from the upper side thereof, the lower end of said operating member being journaled in the upper body part, and means forming a detachable driving engagement between the lower end of said operating member and said plug valve, whereby said lower body part can be removed from said upper body part together with the plug valve, without disturbing said operating member and said first valve.

3. In apparatus of the character described, a hollow body adapted to be secured to the lower wall of the liquid tank, valve means adapted to be actuated by liquid under pressure and carried by said body, said valve means being adapted to be disposed within said tank, said valve means when actuated to open position serving to permit flow of liquid from the tank into said body, at least two liquid discharge conduits connected with the interior portion of said body, a valve mounted within said body serving to distribute flow of liquid to either one of said two liquid discharge conduits, and an operating member extending thru the tank from the upper side thereof, the lower end of said operating member extending into said body and having an operative connection with said last mentioned valve.

4. In apparatus of the character described, a hollow body adapted to be secured to the lower wall of a liquid tank and formed of upper and lower separable parts, valve means carried by the upper body part and adapted to be disposed within the tank, said valve means when open serving to permit flow of liquid from the tank into said body, a rotatable operating member extending down thru the tank from the upper side thereof, the lower end portion of said operating member being journaled in said upper body part, at least two liquid discharge conduits communicating with said body exteriorly of the tank, a distributing valve mounted within the lower part of the body and having a detachable driving connection with the lower end of the operating member, and means for packing the joint between the operating member and said upper body part, whereby when said valve means is closed, liquid cannot flow into the body from the tank.

5. In apparatus of the character described, a hollow body adapted to be secured to the lower wall of a liquid tank, said body having an exterior portion, a plurality of liquid discharge conduits connected to the exterior portion of the body, hydraulic pressure operated valve means carried by said body and adapted to control flow of liquid from the tank into the interior portion of the body, a distributing valve mounted within the exterior portion of said body and serving to control distribution of liquid to said conduits, and means for operating said distributing valve from the exterior of said body and said tank.

6. In apparatus of the character described, a hollow body formed of two separable upper and lower parts, the upper part being adapted to be secured to a wall of a tank and the lower part being adapted to be positioned outside the tank, valve means mounted upon the upper body part and serving to control flow of liquid from the tank into said body, a plurality of conduits communicating with the lower body part exteriorly of the tank, a distributing valve mounted within the lower body part and adapted to control flow of liquid from the body through said conduits, and an operating member extending downwardly through the tank and having a driving connection with said distributing valve, whereby said lower body part can be removed from the upper body part, together with said distributing valve.

REGINALD C. SHAND.